Patented Dec. 3, 1929

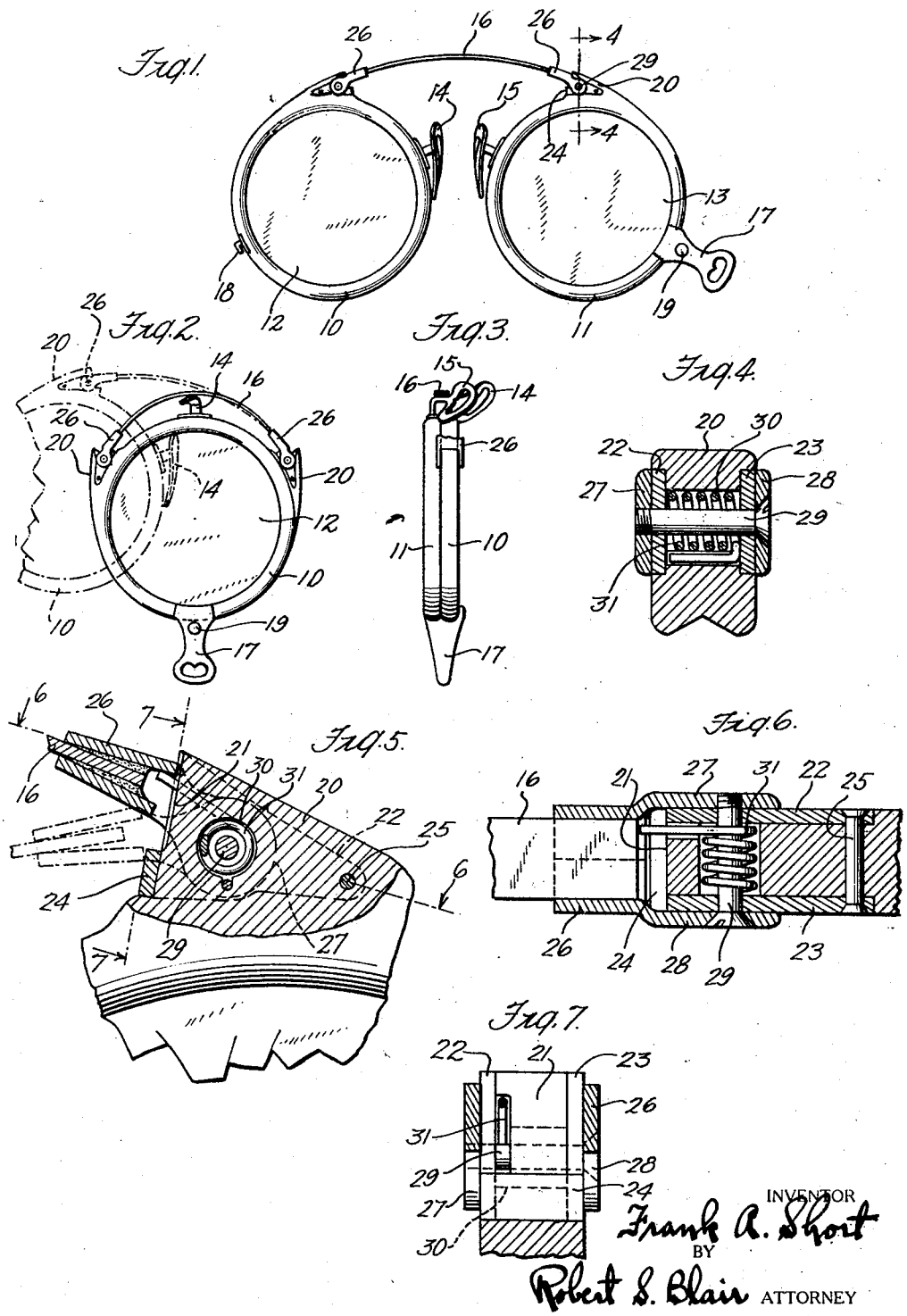

1,737,979

UNITED STATES PATENT OFFICE

FRANK A. SHORT, OF HILLSIDE, NEW JERSEY

EYEGLASS CONSTRUCTION

Application filed November 17, 1926. Serial No. 148,822.

This invention relates to eyeglass construction and more particularly to eyeglass frames of the folding type.

One of the objects of the invention is to provide a construction of the above nature which is capable of meeting the most rigid requirements met with in practical use. Another object is to provide a folding eyeglass frame which is neat and attractive in appearance. Another object is to provide a folding eyeglass frame which will withstand severe usage and afford long dependable service. Another object is to provide a construction of the above nature which is simple to build and assemble and which is inexpensive. Another object is to provide a construction of the above nature which overcomes certain defects found in folding eyeglass frames commonly in use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is an elevation showing a pair of folding eyeglasses;

Figure 2 shows in full lines the eyeglass frame in folded position and in dotted lines the frame in the course of folding;

Figure 3 is a side view of the full line position of Figure 2;

Figure 4 is a transverse section taken substantially along the line 4—4 of Figure 1;

Figure 5 is a longitudinal section through the parts which are shown in section in Figure 4;

Figure 6 is a section taken substantially along the line 6—6 of Figure 5, and

Figure 7 is a section taken substantially along the line 7—7 of Figure 5.

Similar reference characters refer to similar parts throughout the several views of the drawing.

Referring now to Figure 1 of the drawing, there is shown a folding eyeglass frame of the Oxford type in open or unfolded position. The frame comprises a pair of rims 10 and 11 in which are mounted the respective lenses 12 and 13, the rims being provided with nose pieces 14 and 15 which may be of any desired type, and being connected by a bridge member 16. The bridge member 16 takes the form of a flat strip of springy and resilient metal which, when the eyeglasses are in position upon a wearer, urges the nose pieces 14 and 15 toward each other to grip the sides of the nose.

The eyeglass frame is folded by swinging the rims together so that they rest one over the other. The rim 11 is provided with a handle 17 which may be of any desired construction. Mounted upon or contained within this handle member is a suitable catch indicated at 19 for cooperating with a part of the rim 10 to hold the frame in folded position. On the rim 10 is shown a projecting lug 18 for cooperating with the catch. The catch may be of any desired type and its construction is not shown herein since, of itself, it forms no part of this invention. When the frame is folded, as shown in Figures 2 and 3, the spring bridge 16 is bent and it thus continually tends to unfold the folded frame. When the catch 19 is released from the part 18 the eyeglass frame snaps into the opened position shown in Figure 1.

Considering now the connections between the bridge member 16 and the rims 10 and 11, the structure is preferably the same at each end of the bridge so that one only need be described in detail. The rims 10 and 11 shown herein are formed of a non-metallic material such as celluloid or material having properties similar to those of celluloid and commonly employed in the construction of eyeglass frames. Considering the rim 11, it is provided at its upper portion with a portion 20 which is thickened in a radial direction, this thickened portion terminating in an abrupt shoulder 21 (Figure 5) at its end facing toward the rim 10, and preferably gradually tapering off at its other end. At this thickened portion of the non-metallic rim member the end of the bridge 16 is connected by a pivotal connection.

There is secured to the thickened portion 20 a metal member which comprises two plate portions 22 and 23 resting against the respective sides of the portion 20, these side plate members being connected by a part 24 passing around the base of the shoulder 21. The parts 22 and 23 are preferably set into the non-metallic material so that their outer surfaces rest substantially flush with the non-metallic surfaces, as is brought out in Figures 4 and 6. This metal member is preferably rigidly secured to the non-metallic material by a suitable part, such as a rivet 25, passing through the parts 22 and 23 adjacent their ends and through the non-metallic material therebetween.

The end of the spring bridge member 16 has secured thereto a metal member in the form of a sleeve 26 from which projects a pair of spaced ears 27 and 28. These ears 27 and 28 embrace the plate members 22 and 23 respectively, and passing therethrough is a pivot post conveniently taking the form of a screw 29. The head of this screw 29 is preferably countersunk in the ear 28, the screw passing thence through the plate 23, through an opening 30 in the non-metallic material, through the plate 22, and being threaded at its end in the ear 27.

The screw 29 thus pivotally connects the bridge 16 with the eyeglass rim, forming a pivot pin about the axis of which the bridge may swing upon the rim. Positioned within the opening 30 and coiled therein about the screw 29 is a spiral spring 31. This spring is connected, as shown in Figures 5, 6 and 7, to swing the bridge 16 outwardly, and it normally holds the parts in the position shown best in Figure 5. It will be seen that the screw 29 is rotatably supported in the two plate members 22 and 23 and thus has two metallic bearings in which it turns as the bridge and rim are swung relative to each other. The pivot screw is thus provided with a strong and dependable metallic bearing in the two plate members. The spring 31 is coiled loosely about the pivot screw so that, as the parts are swung and the spring contracts and expands, there is no binding action upon the screw. In addition, the ears 27 and 28 are provided with metal bearings by the plates 22 and 23 against the outer surfaces of which they rub as swinging occurs. The surfaces of the plates 22 and 23 may be given a high polish so that friction is reduced to a minimum. The structure provides an exceptionally free acting and rugged pivotal connection between the bridge and the rim.

As mentioned above, the spring 31 normally holds the bridge in its outermost position from the rim, as shown in Figure 5. The parts are in this position when the eyeglasses are being worn. The ends of the plate members 22 and 23 above the connecting part 24 preferably come substantially flush with the shoulder 21, or extend very slightly beyond the shoulder, as shown in Figures 5 and 6. These ends or edges of the plates 22 and 23 form a metallic stop for limiting the outward swinging of the bridge. As shown in Figure 5, the end of the part 26 abuts the ends of the plates 22 and 23 when the eyeglasses are extended. The two metal plates, engaging with the part 26 adjacent the two sides thereof, provide a stop which lends very substantially to the stability of the mounting.

In folding an eyeglass frame of this nature, it is the general practice to hold the rim 11 by means of the handle 17 in something approaching a vertical position, such as shown in Figure 2. Thereupon, the rim 10 is swung downwardly, as shown by the dotted lines in Figure 2, the first action being the swinging of the bridge downwardly about the pivot 29 on the rim 11 and the subsequent action being the bending of the spring bridge 16 as the rim 10 is moved into position over the rim 11. With the construction disclosed herein, as this folding action takes place, the bridge first swings about the pivot 29 downwardly or inwardly toward the rim 11 until the sleeve 26 comes into engagement with the metal part 24, as shown in dotted lines in Figure 5. This metal part 24 thus limits the swing of the bridge about its pivot inwardly toward the rim. This engagement of the sleeve 26 and the part 24 provides a fulcrum about which the spring bridge 16 is thereafter bent as the folding action proceeds. The part 24 is so positioned that the sleeve 26 engages therewith before the bridge 16 has swung inwardly far enough to strike the nose pieces 14 or 15. In the dotted line position shown in Figure 2 the parts 26 and 24 are engaged and the bending of the spring 16 about the part 24 as a fulcrum has begun.

The features just described, whereby a stop is provided to limit the inward swinging of the bridge about its pivot and forming a fulcrum adjacent to the pivot about which the spring bends as the folding action takes place, are distinctly advantageous. The spring always bends evenly and smoothly without kinking. In constructions wherein the spring bends about the nose pieces as a fulcrum, the spring soon becomes kinked and permanently distorted. The construction disclosed herein also makes for a more complete utilization of the resilience of the spring bridge in snapping the eyeglass frame to open position when the catch is released. Because of the thorough utilization of the resilience of the spring bridge, the springs 31 about the pivot pins are not required to be as strong as in constructions lacking the features just described.

From the foregoing it will be seen that there is herein provided a construction which achieves the objects of this invention and accomplishes results of distinct practical importance.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:

1. In eyeglass construction, in combination, an eyeglass frame including a non-metallic rim member and a metal bridge member, and means pivotally connecting said bridge to said rim comprising a pivot pin, a spring coiled about said pin and connected to swing said bridge, and metallic means secured to said non-metallic rim member and supporting said pivot pin thereon independently of said spring.

2. In eyeglass construction, in combination, an eyeglass frame including a non-metallic rim member and a metal bridge member, and means pivotally connecting said bridge to said rim comprising a pivot pin secured to said bridge, metallic means secured to said non-metallic rim member and providing a metallic bearing in which said pin is rotatably supported, and a spring coiled loosely about said pivot pin and connected to swing said bridge about the axis of said pin in said metallic bearing.

3. In eyeglass construction, in combination, an eyeglass frame including a non-metallic rim member and a metal bridge member, and means pivotally connecting said bridge to said rim comprising a pair of spaced metal parts secured to said non-metallic rim member, a pivot pin passing into an end portion of said bridge and into said pair of spaced metal parts, said pair of spaced metal parts thereby supporting said pivot pin upon said rim member, and a spring coiled about said pin between said spaced metal parts and connected to swing said bridge about the axis of said pin.

4. In eyeglass construction, in combination, a non-metallic rim member, a pair of metal plate members secured against opposite sides of a portion of said rim member, a metal bridge member, a pivot pin for pivotally connecting said bridge to said rim, said pin entering each of said two metal plates and being supported thereby upon said rim, and a spring coiled about said pin and connected to swing said bridge about said pin.

5. In eyeglass construction, in combination, a non-metallic rim member, a pair of metal plate members secured against opposite sides of a portion of said rim member, a bridge member having at its end portion a pair of spaced ears resting respectively against the surfaces of said two metal plates, and a pivot pin for pivotally connecting said bridge and said rim, said pin passing through said two ears and through said two plates.

6. In eyeglass construction, in combination, a non-metallic rim member, a pair of metal plate members secured against opposite sides of a portion of said rim member, a bridge member having at its end portion a pair of spaced ears resting respectively against the surfaces of said two metal plates, and a pivot pin for pivotally connecting said bridge and said rim, said pin being secured in said two ears and being rotatably supported adjacent its two ends in said two metal plate members.

7. In eyeglass construction, in combination, a non-metallic rim member, a pair of metal plate members secured against opposite sides of a portion of said rim member, a bridge member having at its end portion a pair of spaced ears resting respectively against the surfaces of said two metal plates, a pivot pin for pivotally connecting said bridge and said rim, said pin being secured in said two ears and being rotatably supported adjacent its two ends in said two metal plate members, and a spring coiled loosely about said pin between said two plate members and connected to swing said bridge about said pivot.

8. In eyeglass construction, in combination, a non-metallic rim member, a bridge member having at its end portion a pair of spaced metal ears embracing the sides of a portion of said rim member, a pivot pin passing through said ears and through said rim member for pivotally connecting said rim and said bridge, and metallic means interposed between said ears and the surfaces of said non-metallic material to provide metallic bearings for said ears as they swing about said pivot.

9. In eyeglass construction, in combination, a non-metallic rim member, a pair of metal plate members secured against opposite sides of a portion of said rim member, a bridge member having at its end portion a pair of spaced ears resting respectively against the outer surfaces of said metal plate members, a pivot pin for pivotally connecting said bridge and said rim, said pivot pin comprising a screw passing through one of said ears and threaded into the other thereof and having a bearing in each of said metal plate members, and a spring coiled about said pivot pin between said metal plate members and urging said bridge member to swing.

10. In eyeglass construction, in combination, a non-metallic rim member having a portion thereof thickened in a radial direction and terminating at one end in an abrupt shoulder, a bridge member pivoted upon said rim at said thickened portion, spring means urging said bridge to swing outwardly from said rim about said pivot, and a pair of metal plate members secured against the respective side surfaces of said thickened portion, said plate members terminating adjacent said shoulder and providing a metallic stop for limiting the swinging of said bridge under the urge of said spring means.

11. In eyeglass construction, in combination, a non-metallic rim member having a portion thereof thickened in a radial direction, said portion terminating at one end in a shoulder, a bridge member pivoted upon said rim at said thickened portion, and a metal member secured to said rim member comprising a pair of side pieces resting against the respective side surfaces of said thickened portion and a piece joining said side pieces and extending across the face of said shoulder.

12. In eyeglass construction, in combination, a non-metallic rim member having a portion thereof thickened in a radial direction, said portion terminating at one end in a shoulder, a bridge member having at its end portion a pair of spaced ears embracing said thickened portion, a metal member secured to said rim member comprising a pair of side pieces resting against the respective sides of said thickened portion and beneath said ears, a pivot pin passing from one of said ears into the other thereof and having bearings in said metal side pieces, a spring coiled about said pin and normally holding said bridge outwardly in a position approximately tangential to said rim, and a metal part integral with said side pieces adapted to limit the swinging movement of said bridge inwardly toward said rim.

13. In eyeglass construction, in combination, a pair of non-metallic rim members, a spring bridge extending between said rim members and pivotally connected thereto at its respective ends, said rim members being adapted to be swung into folded position one over the other by swinging movement about said bridge pivots and by bending of said bridge, and metallic means upon each of said non-metallic rim members positioned so as to provide abutments beneath said bridge at points adjacent the ends thereof and spaced respectively a substantial distance in a radial direction beyond the outer circumference of its supporting rim member and adapted to come into engagement with said bridge as said folding proceeds to limit the swinging movement about said pivots.

14. In eyeglass construction, in combination, a non-metallic rim member, a spring bridge member pivotally connected to said rim member, and metallic means upon said non-metallic rim member adjacent said pivot comprising a pair of side plates resting against the side surfaces of the rim member and a part extending between said side plates and between the rim surface and a portion of said bridge, said last part being adapted to limit the swinging movement of said bridge inwardly toward said rim.

15. In eyeglass construction, in combination, a non-metallic rim member, a spring bridge member pivotally connected to said rim member, and metallic means upon said non-metallic rim member adjacent said pivot comprising a pair of side plates resting against the side surfaces of the rim member and a part extending between said side plates and between the rim surface and a portion of said bridge, said last part being adapted to limit the swinging movement of said bridge inwardly toward said rim, and said side plates having portions positioned to limit the swinging movement of said bridge outwardly away from said rim.

16. In eyeglass construction, in combination, a non-metallic rim member, a spring bridge pivotally connected thereto, and metallic means secured to said rim member, disposed so as to provide an abutment beneath said bridge at a point adjacent an end thereof and spaced a substantial distance in a radial direction beyond the outer circumference of said rim member, said abutment being formed and adapted to be engaged by said bridge to limit its swinging movement about said pivot inwardly toward the said circumference of said rim member.

In testimony whereof, I have signed my name to this specification this 19th day of October, 1926.

FRANK A. SHORT.